Sept. 9, 1952  D. L. SHANKLIN ET AL  2,610,131

METHOD FOR FORMING LINED CONTAINER CLOSURES

Original Filed Feb. 21, 1949

Inventors
DUNBAR L. SHANKLIN
RICHARD C. ADAMS
By Theodore C. Browne
Att'y

Patented Sept. 9, 1952

2,610,131

UNITED STATES PATENT OFFICE 2,610,131

METHOD FOR FORMING LINED CONTAINER CLOSURES

Dunbar L. Shanklin, Winchester, and Richard C. Adams, Cambridge, Mass., assignors to Dewey and Almy Chemical Company, Cambridge, Mass., a corporation of Massachusetts Original application February 21, 1949, Serial No. 77,622. Divided and this application April 27, 1950, Serial No. 158,486

6 Claims. (Cl. 117—65)

This application is a division of our copending application Serial No. 77,622, filed February 21, 1949.

This invention is concerned with a process of forming lined container closures, especially of the type for sealing glass containers where the sealing surface of the container may be irregular. The invention deals especially with the formation of sealing gaskets on container closures from sealing material formed of paste resin-plasticizer mixtures which must be baked after being applied to the closures in order to cause fluxing of the gasket material.

In the closure art, gaskets of sealing material which form the hermetic joint between the container parts are known as "linings" and the operation of applying the gasket to the closure is known as "closure lining" or simply "lining." Hereafter, in order to adopt a phraseology which is consistent with the art, the word lining will be used.

Where the lining is being formed on a closure having a decorative design on the outer surface and a protective coating on the inner surface, the fluxing step introduces a problem in preventing damage to the decorative and protective coatings from the heat required to flux the lining.

The invention is also concerned with a baking oven especially designed for carrying out the process of the invention.

The manufacture of glass, although much improved in accuracy, still produces jars which are grossly inaccurate when compared to the mechanical standards existing in metal fabrication. The rim of a glass jar lies only in an approximate, not a true, plane, and the eccentricity of its diameter varies very frequently as much as a 32nd of an inch. As a result, closures for glass jars are called upon to seal wide gaps. This requirement, in turn, demands that the sealing element of a glass closure should be thick enough and deformable enough to compensate for all of the irregularities in the glass finish.

The necessity for applying a large quantity of sealing material to the closure in forming the lining has always caused difficulties in the past. The application has been slow as contrasted with can manufacture, and the drying and cure of the sealing material has been both slow and difficult.

The technology of placing thick linings on closures for glass containers has been greatly aided by the development of the so-called "paste" sealing compounds. Pastes are liquid or plastic systems comprised of small particles of a synthetic resin, which are suspended in a liquid plasticizer. Paste-forming resins must have the peculiar property of being substantially insoluble in the plasticizer at the atmospheric temperatures which are normally encountered, but they must be completely soluble in the plasticizer at some considerably higher temperature. When pastes are heated, and after the resin has gone into solution, a gel is formed which turns into a permanent, rubbery and elastic substance after it has cooled.

Since paste technology eliminates the necessity for driving off the liquid carrier which previously had to be used in all sealing compounds which were applied to the closure in liquid form, for example, the water of latex, the manufacture of glass closures has become a very rapid procedure. But the use of pastes has, in turn, introduced another serious problem because it is necessary to heat the paste-lined closure to a high temperature in order to convert the paste into the rubbery gel. The temperature of paste-gel conversion is of the same order of magnitude as are the temperatures which destroy the lithographic designs on the outer surface and the protective coating on the interior of the closure.

When paste compounds are fluxed on coated container closures, the coating frequently becomes brittle and usually changes color. Often, the white coating on the interior of a closure changes to spotty, dirty gray or to tan and even to coffee brown shades after the lining has been applied and fluxed. This change in color, if nothing more, makes the closures unsalable, for the public associates brightness and whiteness of the coating with the retention of quality in the foodstuff. Although there is no reason why a housewife should throw away a jar of mayonnaise or of peanut butter if the coating of the closure is colored or stained, nonetheless she does. The grocer then has a complaint and returned goods on his hands. The maintenance of unchanged appearance of the coating, therefore, has a high degree of economic significance.

In studying the darkening of the commercial tin-plate coatings at the degree of heat necessary to flux paste-lining compositions, we discovered that there is an induction period before any noticeable change occurs. For example, a white closure-coating may be exposed to a high temperature for a certain minimum period and no change will be noted. After the time threshold has expired, darkening progresses with great rapidity. We found that the thresholds vary from coating to coating and that the products of different manufacturers, have materially different darkening characteristics. As a rough average, however, the time threshold is approximately two minutes at 350° F.

The demand for very rapid heating in the fluxing step was made manifest by this discovery, but very rapid heating is usually achieved by establishing the greatest possible temperature difference between the object to be heated and the medium which imparts heat to the object. Since we had determined that the threshold, before darkening of the coating, was a time-temperature relationship, we found that in ovens of conventional design using still air, or air moving at low velocity, as the heat transfer medium, the temperature of the heat transferring medium had to be raised so high that, if the closures were to be heated, fluxed and cooled before the darkening commenced, the time value became vanishingly small, so small in fact that it was not possible to handle the closures in the time available.

This invention permits the fluxing operation, i. e., the heating step which converts the paste to the gel, to be conducted at the requisite temperature but prevents damage to the lithography or protective coating from occurring. The invention also produces container closure-linings which have materially enhanced elastic properties as contrasted to linings of conventionally heated pastes with the result that they conform more readily to the inaccuracies of the glass finish.

According to our invention, we achieve rapid heating, by first heating a large volume of air to a temperature not in excess of 5° F. above the temperature chosen for the fluxing operation and then propel this large volume of heated air against the lined closure at such a velocity that the temperature of the closure rises to the fluxing temperature within a period of sixty seconds and preferably even more quickly. We can achieve this rapid rate of heating if the minimum average velocity of the heated air is maintained at or above 1500 feet per minute. We then remove the closures from the heating zone so quickly and cool them so that the total exposure to heat will never exceed two minutes.

By heating a large volume of air, then forcing it at high velocity against the closure, we transfer a sufficient number of heat units to the sealing element in a short enough time to accomplish our purpose, although the temperature of the air mass is substantially that of the fluxing temperature of the compound. Closures, when treated in this manner, maintain unchanged the original characteristics of the lithography and protective coating.

The surprising discovery was then made that the gels which were formed by bringing the mass to its maximum temperature in a few seconds showed a higher penetration (greater softness) for a given percentage elongation than did gels which were subjected to the same maximum temperature, but reached that temperature more slowly.

At present, we cannot explain this phenomenon. Whatever its reason may be, we have found, by averaging the results of many determinations of softness as measured by the Ames[1] penetrometer, that linings produced by our quick-heating process are 30% softer than linings fluxed to the same percentage elongation but heated in a conventional oven. For example, to produce a lining having 250% elongation at break required a processing time of only 45 seconds in our quick-heating process and produced a penetration of 28, whereas producing a lining having the same percentage elongation by heating in a standard electric oven[2] required 3 minutes and resulted in a penetration of only 21.

Of course, it is possible to increase the softness of any plasticized compound by increasing the ratio of plasticizer to resin, but this is not a proper solution of the softness problem in a container sealing compound. The reason is that such compounds are thermoplastic and the greater the ratio of plasticizer to resin, the more thermoplastic the compound becomes. Since most foods are packed hot, the danger of cutting through the seal when the cap is turned down or when the cap is urged towards the glass by the differential pressure between atmospheric and the reduced internal pressure increases as the proportion of plasticizer increases. Hence, any expedient which increases softness without at the same time increasing the proportion of plasticizer in the compound is of great value in container sealing technology.

Both phases of our invention will be described below with reference to the accompanying drawing in which.

Figure 1:
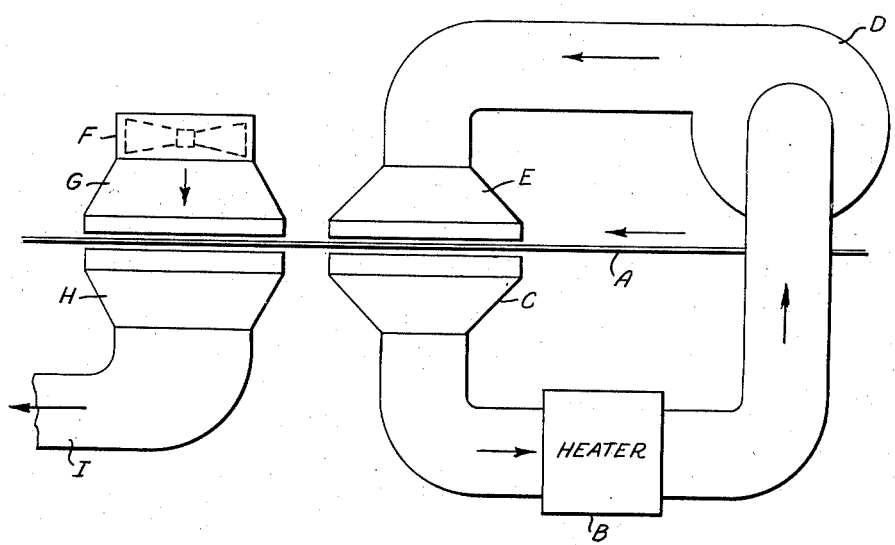
Figure 1 is a diagrammatic showing of apparatus suitable for performing the process of the invention.

In Figure 1 of the drawing suitable apparatus for carrying out the process of the invention is illustrated in diagrammatic form. The freshly lined container closures are placed upon a moving conveyor A of open meshwork construction which moves the closures in a horizontal plane through a heating zone or chamber in which heated air is blown vertically downward against the closures carried by the conveyor A. In most cases, the lined closures will be placed upon the conveyor with their lined faces turned upwardly. The heating medium acting on the closures and passing through the heating zone is supplied from an oven system formed of a heater B having its intake connected to the lower portion C of a heating chamber through which the conveyor moves and having its output connected to the intake of the blower D. The outlet of the blower D is connected to the upper portion E of the heating chamber opposite the intake C of the heater B. The arrangement is such that the blower D causes a continuous stream of heated air to pass vertically downward through the uncovered spaces of the conveyor A surrounding the closures, through the heater B, through the blower and back through the conveyor. After the closures pass through the heating zone or chamber, they pass through a cooling zone or chamber in which air at a considerably reduced temperature is blown transversely through the conveyor to cool the closures as rapidly as may be required according to the speed of movement of the conveyor. The arrangement for supplying the cooling air is represented by a blower F mounted on top of the upper portion G of the cooling chamber. The cooling air after pass-

---

[1] *The Ames Penetrometer Test.*—A sample .030″ thick is laid on an iron anvil and the penetration of a loaded flat faced rod of 1/16″ diameter area is read ater 30 seconds. Zero is determined when the load is 85 grams. A 455 gram weight is then added and penetration in 1/100 millimeter is read at the end of 30 seconds. Low readings thus indicate hard samples.

[2] Oven used for comparison Precision-Freas Model 605 mechanical convection constant temperature type.

ing through the conveyor enters the lower part H of the cooling chamber and is conducted out of the building through the conduit I.

Figure 2:
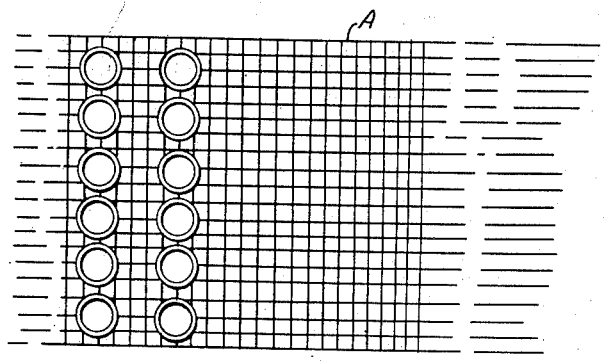
Figure 2 is a plan view of a portion of the conveyor belt showing a number of enclosures positioned thereon.

Figure 2 shows a plan view of a section of the conveyor A which conveniently may assume the form of an endless flexible belt. Any suitable construction of belt may be used but it is important to have an open mesh construction which has a very high percentage of open space compared with the closed space. For fastest heating of the closures, the closures should be spaced apart when they are placed on the conveyor to provide at least 50% free area for the passage of heated air through the conveyor and around the edges of the closures. In practice, it will be found that the open space through the conveyor when loaded with closures may vary from 30 to 70%, depending on the size and shape of the closures.

In carrying out the process of our invention, the factors which must be controlled are the speed of the conveyor A, the temperature of the heating medium as it impinges upon the closures in passing through the heating zone, and the velocity of the heating medium. These factors must be correlated to secure proper fluxing of the linings on the closures as they pass through the heating zone without injuring or damaging the decorative and protective coatings on the closures. From the standpoint of commercial production, it is also highly important to speed up the process.

Our process is especially useful in fluxing linings formed of so-called "paste" sealing compound of the type referred to previously. In paste resins based on polyvinyl chlorides, the mass temperature of the heating medium is conveniently maintained at 350° F., the velocity through the conveyor is maintained above 2000 feet per minute and up to any higher value which conveniently may be obtained (this value is to a large degree controlled by the size of the container closures) and total time in the oven may be from 20 to 90 seconds depending on the thickness and type of the lining.

The movement of the heating medium at a high velocity is important in our process in obtaining quick heating with a small differential between the temperature of the medium and the object to be heated. While we do not wish to be limited to any particular theory of explanation of the action, it is believed that the sudden 90° change in direction of a high velocity air stream as it impinges upon the exposed surface of the closures produces a highly turbulent, scouring flow across the closure which greatly aids in imparting heat both to the metal and to the compound surfaces of the closures, because it destroys the skin of static air which usually clings to a surface despite a moving air current. The heat imparted to the metal is conducted to the outer peripheral edges of the closures and imparted to the lining compound through the back surface. At the same time, heat is being supplied to the lined compound by direct impingement of the air stream upon the lining material. Assuming that the area of the lining is 50% of the exposed area of the closure, then the compound receives about an equal amount of heat by its direct exposure to the air and by conduction through the metal to its undersurface.

While different forms of apparatus may be devised for carrying out our process, a novel form of oven especially designed to carry out the process is disclosed in our copending application Serial No. 77,622, filed February 21, 1949.

We claim:

1. The process of fluxing linings on container closures while retaining the protective or lithographic coating on the closure in an undamaged condition by heating the closure in a blast of heated air, said linings being formed of a plastisol comprising small particles of a paste-forming synthetic resin suspended in a non-volatile plasticiser for the resin, said resin being substantially insoluble in the plasticizer at atmospheric temperatures but being completely soluble in the plasticizer at an elevated fluxing temperature and forming at this elevated temperature a permanent gel which becomes elastic and rubbery upon subsequent cooling which comprises arranging the lined closures on an open mesh support, said support being of such open mesh that when it is loaded with closures to be treated 30 to 70% of its area is still free for the passage of air therethrough, directing a continuous stream of heated air upon said closures and around and past the same, said stream continuously discharging through said mesh support, said air being heated to a temperature not substantially less than 300° F. sufficient to flux the lining and not greater than the temperature at which the coating on the closures would discolor within a heating time of two minutes, said flow of air having a velocity through the free areas of the support in excess of 1500 feet per minute and sufficient to cause the closures to attain a temperature within 5° F. of the temperature of the heated air within a period not exceeding 60 seconds, removing the fluxed closures from the stream of heated air within a period such that the overall time of exposure to the heated air is less than two minutes and cooling the closures.

2. The process of fluxing linings on container closures while retaining the protective or lithographic coating on the closure in an undamaged condition by heating the closure in a blast of heated air, said linings being formed of a plastisol comprising small particles of a paste-forming synthetic resin suspended in a non-volatile plasticizer for the resin, said resin being substantially insoluble in the plasticizer at atmospheric temperatures but being completely soluble in the plasticizer at an elevated fluxing temperature and forming at this elevated temperature a permanent gel which becomes elastic and rubbery upon subsequent cooling which comprises arranging the lined closures on an open mesh support, said support being of such open mesh that when it is loaded with closures to be treated 30 to 70% of its area is still free for the passage of air therethrough, spacing the closures on the support to provide at least 50% free area, directing a continuous stream of heated air upon said closures and around and past the same, said stream continuously discharging through said mesh support, said air being heated to a temperature not substantially less than 300° F. sufficient to flux the lining and not greater than the temperature at which the coating on the closures would discolor within a heating time of two minutes, said flow of air having a velocity through the free areas of the support in excess of 1500 feet per minute and sufficient to cause the closures to attain a temperature within 5° F. of the temperature of the heated air within a period not exceeding 60 seconds, removing the fluxed closures from the stream of heated air within a period such that the overall time of exposure to the heated air is less than two minutes and cooling the closures.

3. The process of fluxing linings on container closures while retaining the protective or lithographic coating on the closure in an undamaged condition by heating the closure in a blast of heated air, said linings being formed of a plastisol comprising small particles of a paste-forming synthetic resin suspended in a non-volatile plasticizer for the resin, said resin being substantially insoluble in the plasticizer at atmospheric temperatures but being completely soluble in the plasticizer at an elevated fluxing temperature and forming at this elevated temperature a permanent gel which becomes elastic and rubbery upon subsequent cooling which comprises arranging the lined closures on an open mesh support, said support being of such open mesh that when it is loaded with closures to be treated 30 to 70% of its area is still free for the passage of air therethrough, directing a continuous stream of heated air upon said closures and around and past the same, said stream continuously discharging through said mesh support, said air being heated to a temperature not substantially less than 300° F. sufficient to flux the lining and not greater than the temperature at which the coating on the closures would discolor within a heating time of two minutes, said flow of air having a velocity through the free areas of the support in excess of 1500 feet per minute and sufficient to cause the closures to attain a temperature within 5° F. of the temperature of the heated air within a period not exceeding 60 seconds, said flow of air impinging upon the closures at substantially a right angle to the plane of the closures, removing the fluxed closures from the stream of heated air within a period such that the overall time of exposure to the heated air is less than two minutes and cooling the closures.

4. The process of fluxing linings on container closures while retaining the protective or lithographic coating on the closure in an undamaged condition by heating the closure in a blast of heated air, said linings being formed of a plastisol comprising small particles of a paste-forming synthetic resin suspended in a non-volatile plasticizer for the resin, said resin being substantially insoluble in the pasticizer at atmospheric temperatures but being completely soluble in the plasticizer at an elevated fluxing temperature and forming at this elevated temperature a permanent gel which becomes elastic and rubbery upon subsequent cooling which comprises arranging the lined closures on an open mesh support, said support being of such open mesh that when it is loaded with closures to be treated 30 to 70% of its area is still free for the passage of air therethrough, directing a continuous stream of heated air upon said closures and around and past the same, said stream continuously discharging through said mesh support, said air being heated to a temperature in excess of the fluxing temperature and not substantially less than 300° F. at which the coating discolors if exposed to said temperature for a period of two minutes, said flow of air having velocity through the free areas of the support in excess of 1500 feet per minute and sufficient to cause the closures to attain a temperature within 5° F. of the temperature of the heated air within a period not exceeding 60 seconds, removing the fluxed closures from the stream of heated air within a period such that the overall time of exposure to the heated air is less than two minutes and cooling the closures.

5. The process of fluxing linings on container closures while retaining the protective or lithographic coating on the closure in an undamaged condition by heating the closure in a blast of heated air, said linings being formed of a plastisol comprising small particles of a paste-forming synthetic resin suspended in a non-volatile plasticizer for the resin, said resin being substantially insoluble in the plasticizer at atmospheric temperatures but being completely soluble in the plasticizer at an elevated fluxing temperature and forming at this elevated temperature a permanent gel which becomes elastic and rubbery upon subsequent cooling which comprises arranging the lined closures on an open mesh support, said support being of such open mesh that when it is loaded with closures to be treated 30 to 70% of its area is still free for the passage of air therethrough, directing a continuous stream of heated air upon said closures and around and past the same, said stream continuously discharging through said mesh support, said air being heated to a temperature 5° F. above a predetermined fluxing temperature not substantially less than 300° F., said flow of air having a velocity through the free areas of the support in excess of 1500 feet per minute and sufficient to cause the closures to attain a temperature within 5° F. of the temperature of the heated air within a period not exceeding 60 seconds, removing the fluxed closures from the stream of heated air and rapidly cooling them within a period such that the overall time of exposure of the closures of heat is less than two minutes.

6. The process of fluxing container closure linings formed of a plastisol comprising small particles of a paste-forming synthetic resin suspended in a non-volatile plasticizer for the resin, said resin being substantially insoluble in the plasticizer at atmospheric temperatures but being completely soluble in the plasticizer at an elevated fluxing temperature and forming at this elevated temperature a permanent gel which becomes elastic and rubbery upon subsequent cooling, while retaining the protective or lithographic coating on said closures in an undamaged condition by heating the closures in a blast of heated air whereby the lining, as contrasted with normally fluxed linings of identical composition having the same percentage elongation before break, exhibits materially greater softness which comprises arranging the lined closures on an open mesh support, said support being of such open mesh that when it is loaded with closures to be treated 30 to 70% of its area is still free for the passage of air therethrough, directing a continuous stream of heated air upon said closures and around and past the same, said stream continuously discharging through said mesh support, said air being heated to a temperature not substantially less than 300° F. sufficient to flux the lining and not greater than the temperature at which the coating on the closures would discolor within a heating time of two minutes, said flow of air having a velocity through the free areas of the support in excess of 1500 feet per minute and sufficient to cause the closures to attain a temperature within 5° F. of the temperature of the heated air within a period not exceeding 60 seconds, removing the fluxed closures from the stream of heated air within a period such that the overall time of exposure to the heated air is less than two minutes and cooling the closures.

DUNBAR L. SHANKLIN.
RICHARD C. ADAMS.

REFERENCES CITED

The following references are of record in the file of this patent:

UNITED STATES PATENTS

| Number | Name | Date |
|---|---|---|
| 2,072,536 | Trickey | Mar. 2, 1937 |
| 2,333,629 | Beadle | Nov. 9, 1943 |
| 2,354,855 | Emanuel | Aug. 1, 1944 |
| 2,426,413 | Pollett | Aug. 26, 1947 |
| 2,528,506 | Foye | Nov. 7, 1950 |

OTHER REFERENCES

Baird: British Plastics, April 1948, pp. 167–171.